April 15, 1924.
F. E. LICHTENTHAELER
1,490,333
LIQUID MIXER
Filed Jan. 10, 1924
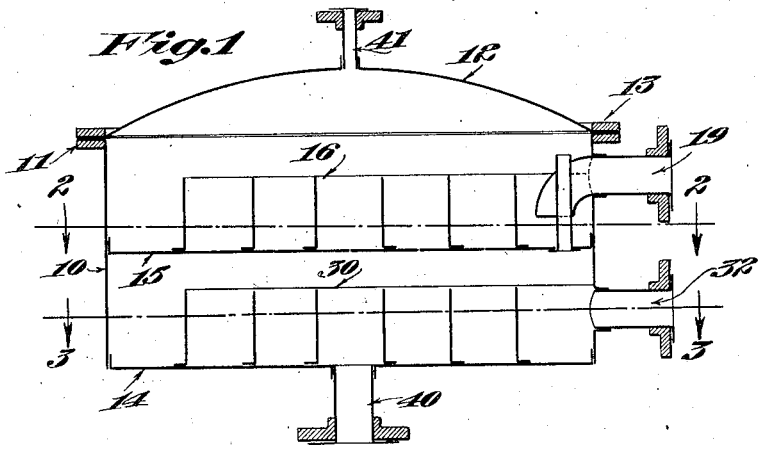
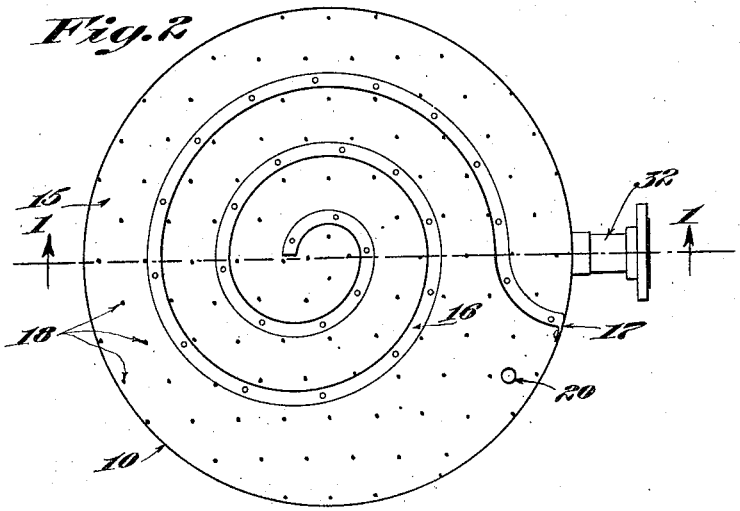
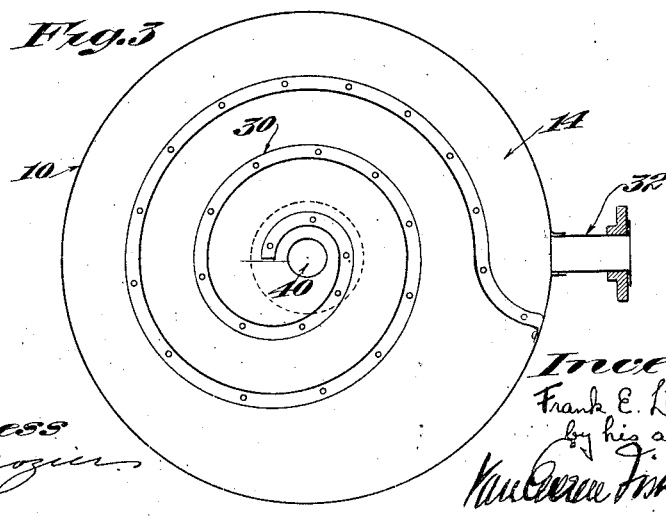
Witness
M. G. Crozier
Inventor
Frank E. Lichtenthaeler
by his attorneys Patented Apr. 15, 1924.

1,490,333

UNITED STATES PATENT OFFICE.

FRANK E. LICHTENTHAELER, OF NEWTON HIGHLANDS, MASSACHUSETTS.

LIQUID MIXER.

Application filed January 10, 1924. Serial No. 685,373.

*To all whom it may concern:*

Be it known that I, FRANK E. LICHTENTHAELER, a citizen of the United States, residing at Newton Highlands, in the county of Middlesex and State of Massachusetts, have invented certain new and useful Improvements in Liquid Mixers; and I do hereby declare the following to be a full, clear, and exact description of the invention, such as will enable others skilled in the art to which it appertains to make and use the same.

The present invention relates to an improvement in liquid mixers.

The object of this invention is to produce an apparatus for mixing liquids such as alcohol and ether without application of external force, and particularly under conditions where there is only sufficient pressure to cause flow of the liquids. The invention consists in the mixer hereinafter described and particularly defined in the claims.

In the accompanying drawing illustrating the preferred form of the invention, Fig. 1 is a vertical sectional elevation of the apparatus taken on the line 1—1, Fig. 2; Fig. 2 is a horizontal section taken on the line 2—2, Fig. 1; and Fig. 3 is a horizontal section taken on the line 3—3, Fig. 1.

The illustrated embodiment of the invention is described as follows: The mixer comprises a shell or body 10 of cylindrical shape formed of copper, provided on its upper edge with a flange 11. A cover 12 provided with a flange 13 forms a closure for the top of the apparatus. The bottom is closed by the plate 14. The apparatus is provided with a deck 15, shown in plan in Fig. 2. On this deck is secured the spiral guide wall 16, which extends from the point 17 on the side wall of the vessel in a spiral manner to a point near the center of the deck. This deck 15 is provided with a large number of small holes 18. An inlet for one of the liquids is afforded by means of the pipe 19, which enters through the side wall in the plane of the section shown in Fig. 1, and is provided with a quarter turn at its end so that liquid discharged through this inlet pipe is directed down upon the floor of the deck. From this point the liquid flows around in the spiral path imposed by the spiral guide wall and the liquid gradually is discharged through the holes 18 into the chamber below. There is also provided a breather pipe 20 which is supported in the deck 15 at the position shown in plan in Fig. 2. In Fig. 1 this breather pipe 20 is rotated from its actual position into the plane of the section shown in Fig. 1. This breather pipe affords opportunity for movements of vapor from one chamber to the other for the purpose of equalizing pressures.

The heavier liquid is admitted to the upper chamber, which is that part of the apparatus above the deck 15. The lower chamber is of the same size as the upper chamber, and is provided with a similar guide wall 30 extending from a point 31 directly below the point 17 and spirally around to a point near the middle of the bottom of the vessel. This guide wall 30 is located directly underneath the spiral guide wall 16 in the upper chamber. This guide wall 30 is riveted and sweated to the bottom in the same manner as the guide wall 16 is riveted and sweated to the deck 15. A second inlet 32 is provided in the side of the vessel directly under the inlet pipe 19 for the upper chamber. It is intended that the lighter liquid should be admitted through this lower inlet pipe, and then the guide wall 30 causes the liquid to flow around the spiral path to the center of the bottom of the apparatus from which it is drawn off through the outlet pipe 40. The upper chamber of the apparatus is vented to the atmosphere or to a suitable condensing or recovery system to prevent vapor losses by means of the pipe 41.

In operation as a mixer for mixing alcohol and ether together for the purpose of making motor fuel, a certain quantity of alcohol or alcohol containing ether is admitted through the upper inlet 19 to the upper chamber. At the same time a proper proportionate amount of ether is admitted through the lower inlet pipe 32 to the lower chamber. The liquid thus admitted to the two chambers flows in parallel superposed paths with the heavier liquid in a path above the lighter, the former flowing over a floor provided with a large number of holes, so that fine streams of the liquid in the upper chamber are allowed to flow downward into the lower chamber and there to be mixed with the liquid in such chamber. As the liquid in the two chambers flows through parallel superposed paths, the liquid from the upper compartment is mixed with the liquid in the lower compartment by the motion of the liquid and the numerous holes through which the liquid in the upper compartment is permitted to flow into the lower compartment.

This mixer is especially available where vertical space is limited, as it is apparent that these two layers of liquid will gradually be mixed in the process of flowing in parallel paths, the upper liquid flowing into the lower throughout the entire length of the superposed paths. The size and number of the holes in the plate upon which the upper layer of liquid flows must be such as to allow some small amount of liquid to survive practically to the end of the upper path. The finer and more closely spaced the holes, the more nearly is the ideal of the mixer approached.

While either the heavier or the lighter liquid may be used in either compartment, it is preferred to admit the heavier liquid to the upper chamber so that when this heavier liquid falls in small streams through the perforations upon the lighter liquid below, it will tend to force itself into such lighter liquid by its increased gravity so as to effect an intimate mixture therewith.

It is desirable that the depth of the liquid flowing through the liquid path in the lower chamber be small so as to secure an intimate mixing of the liquid flowing into it from the upper chamber. The layer of liquid in the upper chamber will, of course, vary in depth, being greatest at the inlet and diminishing gradually in the direction of the flow as the perforations continue to draw from the liquid flowing therethrough.

The important feature of the invention is the superposition of separate streams of liquids to be mixed and the continuous delivery of the liquid from the upper stream to the lower throughout the whole length of the stream. It is immaterial, of course, what form is given the paths through which the liquids flow so long as the paths are maintained parallel and superposed. The invention may be embodied in other forms within the scope of the following claims.

Having thus described the invention, what is claimed is:

1. A liquid mixer having, in combination, two superposed channels for containing and conducting liquids to be mixed, the upper channel being provided with discharge openings throughout its length for discharging liquid from the upper channel into the lower channel so as thereby intimately to mix the liquid from the upper channel with the liquid in the lower channel.

2. A liquid mixer having, in combination, a vessel comprising side walls, a bottom and an intermediate deck dividing the vessel into upper and lower chambers, means for admitting liquids to the two chambers, guiding means on the deck and bottom of the two chambers for guiding the liquids flowing on the deck and bottom in parallel paths, and openings in the deck to permit streams of liquid to flow from the upper chamber into the corresponding parts in the lower chamber.

3. A liquid mixer having, in combination, a vessel comprising side walls, a bottom and an intermediate deck dividing the vessel into upper and lower chambers, means for admitting liquids to the two chambers, and a spiral guide wall in each chamber to guide the liquids in spiral superposed paths, the deck being provided with openings to permit streams of liquid to flow from the upper chamber into the lower chamber to permit intimate mixing of the liquids.

FRANK E. LICHTENTHAELER.